US008438094B2

(12) United States Patent
Shalen

(10) Patent No.: US 8,438,094 B2
(45) Date of Patent: May 7, 2013

(54) METHODS AND SYSTEMS FOR CREATING AND TRADING DERIVATIVE INVESTMENT PRODUCTS BASED ON A SKEW INDEX

(75) Inventor: Catherine T. Shalen, Chicago, IL (US)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 0 days.

(21) Appl. No.: 13/041,107

(22) Filed: Mar. 4, 2011

(65) Prior Publication Data

US 2012/0221482 A1    Aug. 30, 2012

Related U.S. Application Data

(60) Provisional application No. 61/446,695, filed on Feb. 25, 2011.

(51) Int. Cl.
*G06Q 40/00*    (2012.01)
(52) U.S. Cl.
USPC .......................................... 705/36 R; 705/35
(58) Field of Classification Search .......................... None
See application file for complete search history.

(56) References Cited

U.S. PATENT DOCUMENTS

2003/0225658 A1*  12/2003  Whaley ............................ 705/36
2005/0102214 A1*   5/2005  Speth et al. ...................... 705/36
2009/0222372 A1*   9/2009  Hiatt, Jr. ......................... 705/37

OTHER PUBLICATIONS

Jobson, J.D., Applied Multivariate Data Analysis, vol. I: Regression and Experimental Design, 1991, Springer-Verlag New York, Inc., pp. 47-60.*
Whaley, Robert E., Derivatives: Markets, Valuation, and Risk Management, 2006, John Wiley & Sons, Appendix A, pp. 780-801.*
Peter Carr, et al.: "Towards a Theory of Volatility Trading" Jan. 30, 2002, pp. 1-21.

* cited by examiner

*Primary Examiner* — Jason M Borlinghaus
*Assistant Examiner* — Ambreen A Alladin
(74) *Attorney, Agent, or Firm* — Brinks Hofer Gilson & Lione

(57) ABSTRACT

Systems and methods for creating and disseminating a SKEW index based on a statistical property reflecting the skewness of an underlying asset and creating and trading derivative investment products based on the SKEW index are disclosed. In one aspect, a SKEW index associated with an underlying asset is calculated. The SKEW index is accessed and a SKEW derivative is created based on the SKEW index. Information associated width the SKEW derivative is then transmitted for display.

31 Claims, 5 Drawing Sheets

METHODS AND SYSTEMS FOR CREATING AND TRADING DERIVATIVE INVESTMENT PRODUCTS BASED ON A SKEW INDEX

CROSS-REFERENCE TO RELATED APPLICATIONS

The present application claims priority to U.S. Provisional Pat. App. No. 61/446,695, filed Feb. 25, 2011, the entirety of which is hereby incorporated by reference.

FIELD OF THE DISCLOSURE

The present disclosure relates to derivative investment markets. More specifically, the present disclosure relates to aspects of actively creating, disseminating, trading, and auctioning derivatives.

BACKGROUND

A derivative is a financial security whose value is derived in part from a value or characteristic of another security, known as an underlying asset. Two exemplary and well known derivatives are options and futures.

An option is a contract that gives the contract holder a right, but not an obligation, to buy or sell an underlying asset at a specific price on or before a certain date. Generally, a party who purchases an option is referred to as the holder of the option and a party who sells an option is referred to as the writer of the option.

There are generally two types of options: call and put options. A holder of a call option receives a right to purchase an underlying asset at a specific price, i.e., the "strike price." If the holder exercises the call option, the writer is obligated to deliver the underlying asset to the holder at the strike price. Alternatively, the holder of a put option receives a right to sell an underlying asset at a specific price, i.e., the "strike price." If the holder exercises the put option, the writer is obligated to purchase the underlying asset at the agreed upon strike price. Thus, the settlement process for an option may involve the transfer of funds from the purchaser of the underlying asset to the seller of the underlying asset, and the transfer of the underlying asset from the seller of the underlying asset to the purchaser of the underlying asset. This type of settlement may be referred to as "in kind" settlement. However, an underlying asset of an option need not be tangible, transferable property.

Options may also be based on more abstract market indicators, such as stock indices, interest rates, futures contracts and other derivatives. In these cases, "in kind" settlement may not be desired and/or possible. in these cases, the contracts are "cash settled." For example, using cash settlement, a holder of an index call option receives the right to "purchase" not the index itself, but rather a cash amount equal to the value of the index multiplied by a multiplier, e.g., $100. Thus, if a holder of an index call option exercises the option, the writer of the option must pay the holder the difference between the current value of the underlying index and the strike price multiplied by the multiplier. However, the holder of the index will only realize a profit if the current value of the index is greater than the strike price. If the current value of the index is less than or equal to the strike price, the option is worthless due to the fact that the holder would realize a loss.

Similar to options contracts, futures contracts may also be based on abstract market indicators. Futures contracts give a buyer of the future a right to receive delivery of an underlying commodity or asset on a fixed date in the future. Accordingly, a seller of the future contract agrees to deliver the commodity or asset on the specified date for a given price. Typically, the seller will demand a premium over the prevailing market price at the time the contract is made in order to cover the cost of carrying the commodity or asset until the delivery date.

Although futures contracts generally confer an obligation to deliver an underlying asset on a specified delivery date, the actual underlying asset need not change hands. Instead, futures contracts may be cash settled. To cash settle a future, the difference between a market price and a contract price is paid by one investor to the other. Again, like options, cash settlement allows futures contracts to be created based on more abstract "assets" such as market indices. To cash settle index futures, the difference between the contract price and the price of the underlying asset (i.e., current value of market index) is exchanged between the investors to settle the contract.

Derivatives such as options and futures may be traded over-the-counter, and/or on other trading facilities such as organized exchanges. In over-the-counter transactions the individual parties to a transaction are free to customize each transaction as they see fit. With trading platform-traded derivatives, a clearing corporation stands between the holders and writers of derivatives. The clearing corporation matches buyers and sellers, and settles the trades. Thus, cash or the underlying assets are delivered, when necessary, to the clearing corporation and the clearing corporation disperses the assets as necessary as a consequence of the trades. Typically, such standard derivatives will be listed as different series expiring each month and representing a number of different incremental strike prices. The size of the increment in the strike price will be determined by the rules of the trading platform, and will typically be related to the value of the underlying asset.

Additionally, there are two widely utilized methods by which derivatives are currently traded: (1) order-matching and (2) principal market making. Order matching is a model followed by exchanges such as the Chicago Board of Trade, the Chicago Mercantile Exchange, and some newer online exchanges. In order matching, the exchange coordinates the activities of buyers and sellers so that "bids" to buy can be paired off with "offers" to sell. Orders may be matched both electronically and through the primary market making activities of the exchange members. Typically, the exchange itself takes no market risk and covers its own cost of operation by selling memberships to brokers. Member brokers may take principal positions, which are often hedged across their portfolios.

In principal market making, a bank or brokerage firm, for example, establishes a derivatives trading operation, capitalizes it, and makes a market by maintaining a portfolio of derivatives and underlying positions. The market maker usually hedges the portfolio on a dynamic basis by continually changing the composition of the portfolio as market conditions change. In general, the market maker strives to cover its cost of operation by collecting a bid-offer spread and through the scale economies obtained by simultaneously hedging a portfolio of positions. As the market maker takes significant market risk, its counterparties are exposed to the risk that it may go bankrupt. Additionally, while in theory the principal market making activity could be done over a wide area network, in practice derivatives trading is usually accomplished via the telephone. Often, trades are processed laboriously, with many manual steps required from the front office transaction to the back office processing and clearing.

Generally, the return to a trader of a traditional derivative product is largely determined by the value of the underlying security, asset, liability, or claim on which the derivative is based. For example, the value of a call option on a stock, which gives the holder the right to buy the stock at some future date at a fixed strike price, varies directly with the price of the underlying stock. In the case of non-financial derivatives such as reinsurance contracts, the value of the reinsurance contract is affected by the loss experienced on the underlying portfolio of insured claims. The prices of traditional derivative products are usually determined by supply and demand for the derivative based on the value of the underlying security (which is itself generally determined/influenced by supply and demand, or, as in the case of insurance, by events insured by the insurance or reinsurance contract).

While standard derivative contracts may be based on many different types of market indexes or statistical properties of underlying assets, there is a need for a standard derivative contract based on risks associated with an underlying asset.

BRIEF SUMMARY

Accordingly, the present disclosure relates to methods and systems for creating and disseminating a SKEW index reflecting a perceived tail risk of a distribution of returns associated with an underlying asset, as well as methods and systems for creating and auctioning derivative contracts based on the SKEW index.

In one aspect, a computer-implemented method for calculating a SKEW value associated with an underlying asset is disclosed. A trading platform calculates a SKEW index associated with an underlying asset. The trading platform displays the SKEW index associated with the underlying asset on a trading platform display device coupled with the trading platform. The trading platform calculates the SKEW index based on the equation:

$$S = E\left[\left(\frac{R-\mu}{\sigma}\right)^3\right],$$

where S represents a market price of a skewness payoff determined by an asymmetry of the plurality of returns associated with the underlying asset; R is a log return of the underlying asset at an end of a calculation period, μ is a mean of the log return of the underlying asset at the end of the calculation period, and σ is a standard deviation of the log return of the underlying asset at the end of the calculation period;

$$x = \left(\frac{R-\mu}{\sigma}\right)^3$$

represents the skewness payoff; and S=E[x] is a market price representing a risk adjusted expectation of the skewness payoff (x).

In another aspect, a trading platform is disclosed. The trading platform includes a display device, a memory, and a processor in communication with the display device and the memory. The memory stores a set of instructions for calculating a SKEW index associated with an underlying asset. The processor is configured to execute the set of instructions stored in the memory and to: calculate a SKEW index associated with an underlying asset and to display the SKEW index associated with the underlying asset on the display. The SKEW value is calculated based on the equation:

$$S = E\left[\left(\frac{R-\mu}{\sigma}\right)^3\right],$$

where S represents a market price of a skewness payoff determined by an asymmetry of the plurality of returns associated with the underlying asset; R is a log return of the underlying asset at an end of a calculation period, μ is a mean of the log return of the underlying asset at the end of the calculation period, and σ is a standard deviation of the log return of the underlying asset at the end of the calculation period;

$$x = \left(\frac{R-\mu}{\sigma}\right)^3$$

represents the skewness payoff; and S=E[x] is a market price representing a risk adjusted expectation of the skewness payoff (x).

In yet another aspect, a computer-implemented method for creating a SKEW derivative is disclosed. A SKEW index associated with an underlying asset is accessed and a SKEW derivative based on the SKEW index is created. Information associated with the SKEW derivative is transmitted for display.

In a further aspect, a platform is disclosed. The platform includes a memory and a processor in communication with the memory. The memory stores a set of instructions for creating a SKEW derivative. The processor is configured to execute the set of instructions stored in the memory and to: access a SKEW index associated with an underlying asset; create a SKEW derivative based on the SKEW index; and transmit information associated with the SKEW derivative for display.

DETAILED DESCRIPTION OF THE DRAWINGS

SKEW derivatives are financial instruments such as futures and options contacts that trade on trading facilities, such as exchanges, whose value is based on a perceived tail risk of a distribution of returns associated with an underlying asset. A SKEW index is derived from the prices of option contracts on a separate asset, such as an index (e.g., the S&P 500® or CBOE Volatility Index®).

Tail risk is a risk associated with an increase in a probability of outlier returns, returns that are two or more standard deviations below a mean. Outlier returns occur when there is a large sell off of shares by equity market participants that generates extreme downward moves in stock returns. When such a large sell off occurs, prices of stocks and stock indexes, such as the S&P 500®, and their returns are subject to large downward moves. The risk of such large downward moves is referred to as tail risk. Tail risk is typically negligible if the underlying asset has a normal distribution, but can be significant for distributions that are skewed and have fat tails. When a distribution of returns has a fat tail, there is an increased probably of extreme negative returns.

Figure 1:
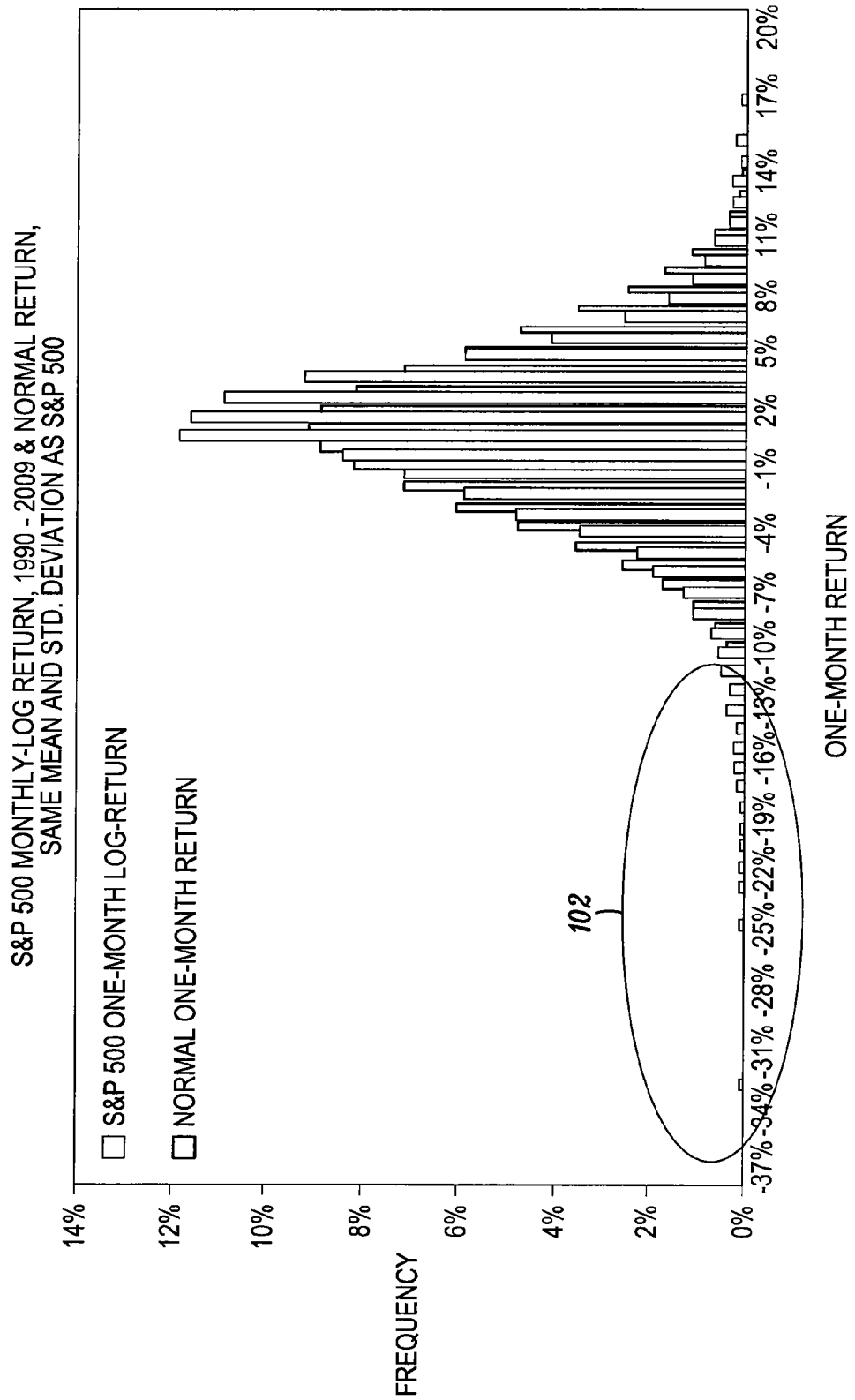
FIG. 1 is a graph illustrating a distribution of S&P 500® monthly log returns and a distribution of normal monthly log returns, where both the distribution of S&P 500® monthly log returns and the distribution of normal monthly log returns have the same mean and the same standard deviation.

FIG. 1 illustrates a distribution of S&P 500® monthly log returns and a distribution of normal monthly log returns, where both the distribution of S&P 500® monthly log returns and the distribution of normal monthly log returns have the same mean and the same standard deviation. As shown in FIG. 1, the distribution of S&P 500® has a sizeable left tail 102. The left tail 102 indicates more risk than a normal distribution.

As explained in more detail below, the SKEW index and derivative contracts based on the SKEW index may be based on the different statistical characteristics of log returns with arbitrary distribution and log returns when the distribution is normal. In one implementation, if the distribution of log returns is normal, the value of the SKEW index is constant and equal to 100. However, if the distribution of log returns is not normal, the SKEW index is a random variable.

SKEW derivatives allow investors to hedge their exposure to tail risk associated with an underlying asset and offers investors a complement to other derivatives that are a close proxy to a standard deviation of an underlying asset. For example, with respect to S&P 500® returns, SKEW derivatives offer a complement to derivatives based on CBOE Volatility Index® (VIX®). VIX® is a close proximity for the standard deviation of S&P 500® returns, wherein the standard deviation describes an average spread of the distribution of returns around the mean of the returns. However, for some investors, VIX® is not a sufficient measure of risk because the distribution of S&P 500® returns is not normal. The SKEW index of S&P 500® returns describes the tail risk of the distribution, and when complemented with VIX®, offers a complementary measure of risk.

Those skilled in the art will recognize that SKEW derivatives having features similar to those described herein and statistical properties which reflect a perceived tail risk of a distribution of returns associated with an underlying asset, but which are given labels other than SKEW derivatives, SKEW futures, or SKEW options will nonetheless fall within the scope of the present disclosure.

Figure 2:
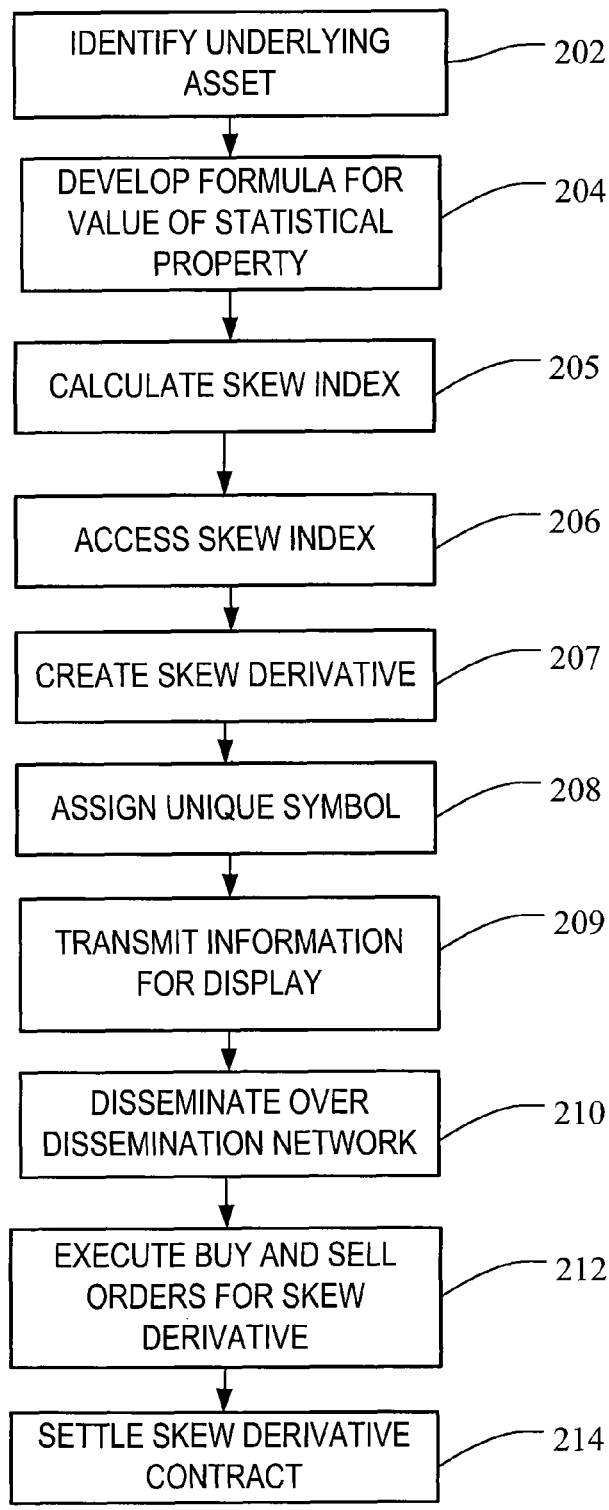
FIG. 2 is a flow chart of one embodiment of a method of calculating and disseminating a SKEW index and creating and trading a SKEW derivative contract based on the SKEW index.

FIG. 2 is a flow chart of one implementation of a method for calculating and disseminating a SKEW index and for creating and trading SKEW derivative contracts that are based on the SKEW index 200, such as a SKEW futures contract or a SKEW options contract. A SKEW derivative contract is a financial instrument in which the SKEW index of an underlying asset is calculated for a distribution of an underlying asset, or a group of underlying assets, at the end of a calculation period. As explained in more detail below, the SKEW index of an underlying asset is calculated as a function of the prices of at-the-money and out-of-the-money options on the underlying asset.

According to one embodiment of the present invention, an investor is able to purchase a SKEW derivative contract before a calculation period begins, or an investor may trade into or out of a SKEW derivative contract during the calculation period before an expiration of the SKEW derivative contract. To facilitate the purchase and trading of SKEW derivative contracts, trading facilities, such as exchanges like the CBOE Futures Exchange or the CBOE Options Exchange, will regularly calculate and disseminate a SKEW index associated with the underlying asset. According to one embodiment of the present invention, the SKEW index is calculated daily, while in other embodiments of the present invention the SKEW index is calculated in real-time, multiple times per day, or in other regular or irregular time increments.

The method for creating and trading a SKEW derivative contract begins at step 202 by identifying an underlying asset or a set of underlying assets for the SKEW derivative contract. Typically, an underlying asset or set of assets is selected based on trading volume of a prospective underlying asset, the general level of interest of market participants in a prospective underlying asset, or for any other reason desired by a trading platform. The underlying asset for the SKEW derivative contract may be equity indexes or securities; fixed income indexes or securities; foreign currency exchange rates; interest rates; commodity indexes; commodity or structured products traded on a trading platform or in the over-the-counter ("OTC") market; or any other type of underlying asset whose value may change from day to day.

According to one embodiment of the present invention, a SKEW derivative contract may be a SKEW options contract, where the underlying asset of the SKEW index is the S&P 500®, the calculation period is 30 days, and the SKEW index of the the S&P 500® is calculated from a portfolio of at-the-money and out-of-the-money S&P 500® options that mimics an exposure to a skewness payoff.

Once the underlying asset or assets have been selected at 202, a formula is developed at 204 for generating a value for a statistical property reflecting a perceived tail risk of a distribution of returns for the underlying asset at the end of a calculation period, also known as the SKEW index of the underlying asset. According to one embodiment of the present invention, the SKEW index is defined to be:

$$SKEW = 100 - 10 * S,$$

where S is a risk-neutral coefficient of statistical skewness. S represents an expectation, or market price of a skewness payoff determined by an asymmetry of an underlying asset log return. When the underlying asset log return is symmetric, the payoff is equal to zero. However, when the underlying asset log return is biased toward negative values the payoff is negative and when the underlying asset log return is biased towards positive values the payoff is positive. It should be appreciated that by defining the SKEW index as shown above, when there is no tail risk, the SKEW index is equal to 100. However, due to the fact that tail risk is typically negative, as tail risk increases, the value of the SKEW index also increases.

S, the risk-neutral coefficient of statistical skewness, may be calculated using the equation:

$$S = E\left[\left(\frac{R-\mu}{\sigma}\right)^3\right],$$

where R is a log return of the underlying asset at the end of the calculation period, μ is the mean of the log return of the underlying asset at the end of the calculation period, and σ is the standard deviation of the log return of the underlying asset at the end of the calculation period;

$$x = \left(\frac{R-\mu}{\sigma}\right)^3$$

represents a skewness payoff; and S=E[x] is a market price representing a risk adjusted expectation of the skewness payoff (x). It should be appreciated that a skewness payoff is a payoff associated with a portfolio of derivatives that is associated with the underlying asset that is used to derive the SKEW index of the underlying asset.

S can be expanded to be a function of prices ($P_1$, $P_2$, and $P_3$) of power payoffs R, $R^2$, and $R^3$ according to the equation:

$$S = \frac{E[R^3] - 3E[R]E\{R^2\} + 2E[R^3]}{(E[R^2] - E^2[R])^{\frac{3}{2}}} = \frac{P_3 - 3P_1P_2 + 2P_1^3}{(P_2 - P_1^2)^{\frac{3}{2}}}.$$

Power payoffs can be replicated by delta-hedging portfolios of at-the-money and out-of-the-money derivatives such that the equations applied to derivative prices to derive $P_1$, $P_2$, and $P_3$ are:

$$P_1 = \mu = E[R_T] = e^{rT}\left(-\sum_i \frac{1}{K_i^2} Q_{K_i} \Delta_{K_i}\right) + \varepsilon_1$$

$$P_2 = E[R_T^2] = e^{rT}\left(\sum_i \frac{2}{K_i^2}\left(1 - \ln\left(\frac{K_i}{F_0}\right)\right)Q_{K_i}\Delta_{K_i}\right) + \varepsilon_2$$

$$P_3 = E[R_T^3] = e^{RT}\left(\sum_i \frac{3}{K_i^2}\left\{2\ln\left(\frac{K_i}{F_0}\right) - \ln^2\left(\frac{K_i}{F_0}\right)\right\}Q_{K_i}\Delta_{K_i}\right) + \varepsilon_3$$

where $F_0$ is a forward derivative level derived from derivative prices; $K_0$ is a first listed strike price below $F_0$; $K_i$ is a strike price of the $i^{th}$ out-of-the-money option (a call if $K_i > K_0$, a put if $K_i < K_0$, or both a put and call if $K_i = K_0$); delta $K_i$ is equal to half the difference between the strike on either side of $K_i$; r is a risk-free interest rate to expiration; $Q(K_i)$ is a midpoint of a bid-ask spread for each derivative with strike $K_i$; T is a time to expiration expresses as a fraction of a year; and $\varepsilon_1$, $\varepsilon_2$, and $\varepsilon_3$ are adjustment terms compensating for a difference between $K_0$ and $F_0$ such that:

$$\varepsilon_1 = -\left(1 + \ln\left(\frac{F_0}{K_0}\right) - \frac{F_0}{K_0}\right)$$

$$\varepsilon_2 = 2\ln\left(\frac{K_0}{F_0}\right)\left(\frac{F_0}{K_0} - 1\right) + \frac{1}{2}\ln^2\left(\frac{K_0}{F_0}\right)$$

$$\varepsilon_3 = \ln^2\left(\frac{K_0}{F_0}\right)\left(\frac{1}{3}\ln\left(\frac{K_0}{F_0}\right) - 1 + \left(\frac{K_0}{F_0}\right)\right)$$

When a portfolio of derivatives used to determine a SKEW index of an underlying asset is not available with the same expiration date as the SKEW derivative associated with the underlying asset, S may be derived by interpolation or extrapolation from $S_{near}$ and $S_{next}$, the prices of skewness at derivatives with adjacent expirations, using the equation:

$$S = w S_{near} + (1-w)S_{next},$$

where $w=(T_{next}-T_N)/(T_{next}-T_{near})$; $T_{near}$ and $T_{next}$ are times to expiration of the near and next term derivatives expressed in minutes; and $T_N$ is the number of minutes during the calculation period.

Further details regarding the derivation of S can be found on pages 10-13 of U.S. Provisional Pat. App. No. 61/446,695, filed Feb. 25, 2011, the entirety of which is hereby incorporated by reference.

Once the underlying asset or assets is chosen at 202 and the formula for generating the value of the statistical property reflecting the perceived tail risk of a distribution of returns for the underlying asset or assets is determined at 204, the SKEW index may be calculated and a SKEW derivative contract based on the SKEW index may be created.

At step 205, the SKEW index may be calculated and at step 206 the SKEW index may be accessed. At step 207, a SKEW derivative contract is created based on the accessed SKEW index and at step 208 the SKEW derivative is assigned a unique symbol. Generally, the SKEW derivative contract may be assigned any unique symbol that serves as a standard identifier for the type of standardized SKEW derivative contract. At step 209, information associated with the SKEW index and/or the SKEW derivative contract is transmitted for display, such as transmitting information to list the SKEW index and/or the SKEW derivative on a trading platform. Examples of the types of information that may be transmitted for display include a settlement price of a SKEW derivative, a bid or offer associated with a SKEW derivative, a value of a SKEW index, and/or a value of an underlying asset that a SKEW index is associated with.

Generally, a SKEW derivative contract may be listed on an electronic platform, an open outcry platform, a hybrid environment that combines the electronic platform and open outcry platform, or any other type of platform known in the art. One example of a hybrid exchange environment is disclosed in U.S. Pat. No. 7,613,650, filed Apr. 24, 2003, the entirety of which is herein incorporated by reference. Additionally, a trading platform such as an exchange may transmit SKEW derivative contract quotes of liquidity providers over dissemination networks 210 to other market participants. Liquidity providers may include Designated Primary Market Makers ("DPM"), market makers, locals, specialists, trading privilege holders, registered traders, members, or any other entity that may provide a trading platform with a quote for a variance derivative. Dissemination Networks may include networks such as the Options Price Reporting Authority ("OPRA"), the CBOE Futures Network, an Internet website or email alerts via email communication networks. Market participants may include liquidity providers, brokerage firms, normal investors, or any other entity that subscribes to a dissemination network.

The trading platform executes buy and sell orders for the SKEW derivative at step 212. The trading platform may repeat the steps of calculating the SKEW index of the underlying asset, accessing the SKEW index, transmitting information for the SKEW index and/or the SKEW derivative for display (list the SKEW index and/or SKEW derivative on a trading platform), disseminating the SKEW index and/or the SKEW derivative over a dissemination network, and executing buy and sell orders for the SKEW derivative (steps 205, 206, 209, 210, and 212) until the SKEW derivative contract is settled at step 214.

In some implementations, SKEW derivative contracts may be traded through an exchange-operated parimutuel auction and cash-settled based on the SKEW index of log returns of the underlying equity. An electronic parimutuel, or Dutch, auction system conducts periodic auctions, with all contracts that settle in-the-money funded by the premiums collected for those that settle out-of-the-money.

As mentioned, in a parimutuel auction, all the contracts that settle in-the-money are funded by those that settle out-of-the-money. Thus, the net exposure of the system is zero once the auction process is completed, and there is no accumulation of open interest over time. Additionally, the pricing of contracts in a parimutuel auction depends on relative demand; the more popular the strike, the greater its value. In other words, a parimutuel action does not depend on market makers to set a price; instead the price is continuously adjusted to reflect the stream of orders coming into the auction. Typically, as each order enters the system, it affects not only the price of the sought-after strike, but also affects all the other strikes available in that auction. In such a scenario, as the price rises for the more sought-after strikes, the system adjusts the prices downward for the less popular strikes. Further, the process does not require the matching of specific buy orders against specific sell orders, as in many traditional markets. Instead, all buy and sell orders enter a single pool of liquidity, and each order can provide liquidity for other orders at different strike prices and the liquidity is maintained such that system exposure remains zero. This format maximizes liquidity, a key feature when there is no tradable underlying instrument.

Figure 3:
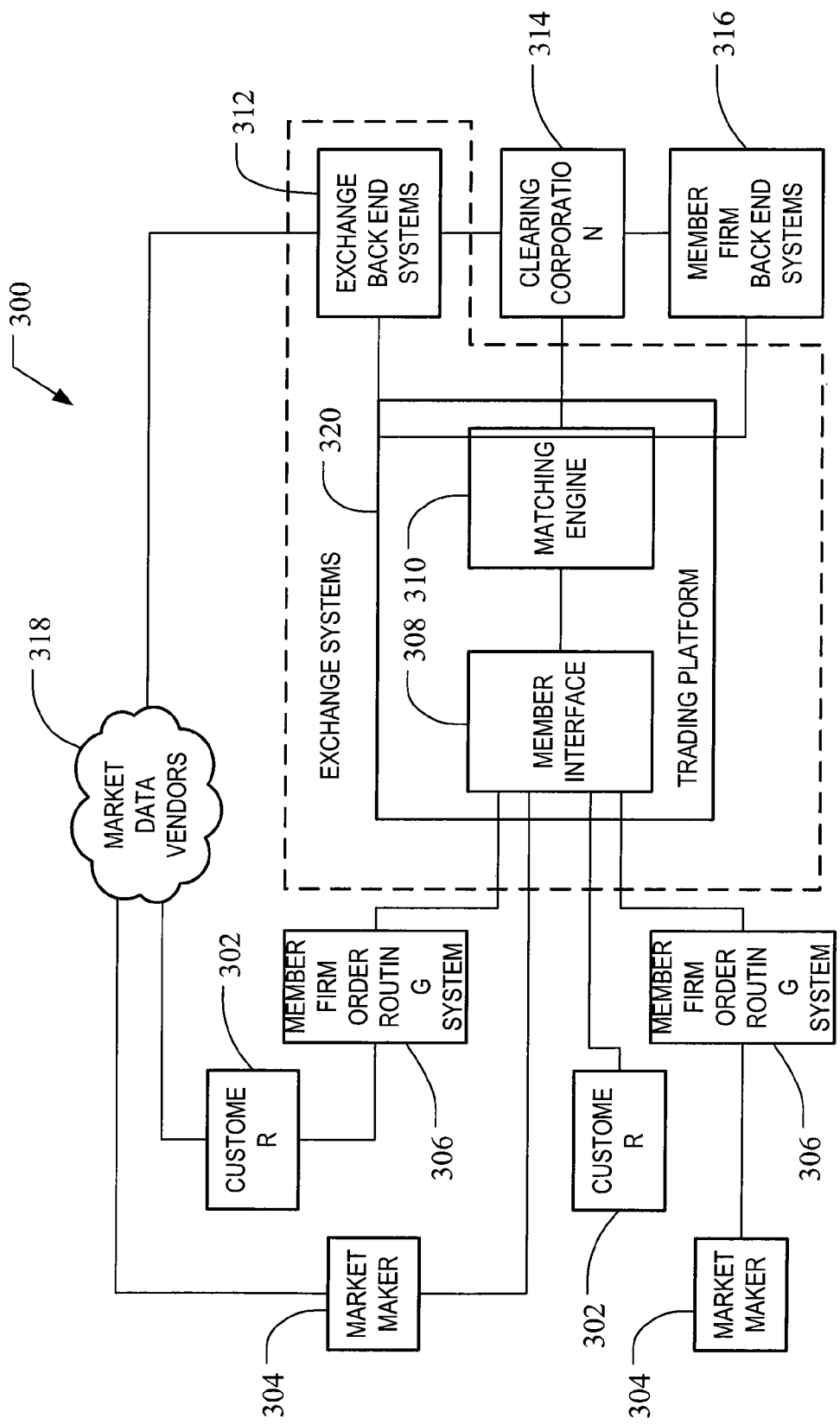
FIG. 3 is a block diagram of one implementation of a system for calculating and disseminating a SKEW index and creating and trading SKEW derivative contracts based on the SKEW index.

FIG. 3 illustrates an electronic trading system 300 which may be used for creating and disseminating a SKEW index and/or creating, listing and trading SKEW derivative contracts that are based on a SKEW index. It will be appreciated that the described systems may implement the methods described above with respect to FIG. 2.

The system 300 includes components operated by an exchange, as well as components operated by others who access the exchange to execute trades. The components shown within the dashed lines are those operated by the exchange. Components outside the dashed lines are operated by others, but nonetheless are necessary for the operation of a functioning exchange. The exchange components of the trading system 300 include an electronic trading platform 320, a member interface 308, a matching engine 310, and backend systems 312. Backend systems not operated by the exchange but which are integral to processing trades and settling contracts are the Clearing Corporation's systems 314, and Member Firms' backend systems 316.

Market Makers may access the trading platform 320 directly through personal input devices 304 which communicate with the member interface 308. Market makers may quote prices for SKEW derivative contracts. Non-member Customers 302, however, must access the exchange through a Member Firm. Customer orders are routed through Member Firm routing systems 306. The Member Firms' routing systems 306 forward the orders to the exchange via the member interface 308. The member interface 308 manages all communications between the Member Firm routing systems 306 and Market Makers' personal input devices 304; determines whether orders may be processed by the trading platform; and determines the appropriate matching engine for processing the orders. Although only a single matching engine 310 is shown in FIG. 3, the trading platform 320 may include multiple matching engines. Different exchange traded products may be allocated to different matching engines for efficient execution of trades. When the member interface 302 receives an order from a Member Firm routing system 306, the member interface 308 determines the proper matching engine 310 for processing the order and forwards the order to the appropriate matching engine. The matching engine 310 executes trades by pairing corresponding marketable buy/sell orders. Non-marketable orders are placed in an electronic order book.

Once orders are executed, the matching engine 310 sends details of the executed transactions to the exchange backend systems 312, to the Clearing Corporation systems 314, and to the Member Firms' backend systems 316. The matching engine also updates the order book to reflect changes in the market based on the executed transactions. Orders that previously were not marketable may become marketable due to changes in the market. If so, the matching engine 310 executes these orders as well.

The exchange backend systems 312 perform a number of different functions. For example, contract definition and listing data originate with the Exchange backend systems 312. The SKEW index and pricing information for SKEW derivative contracts associated with the SKEW index are disseminated from the exchange backend systems to market data vendors 318. Customers 302, market makers 304, and others may access the market data regarding the SKEW index and SKEW derivative contracts based on the SKEW index via, for example, proprietary networks, on-line services, and the like. The exchange backend systems also evaluate the underlying asset or assets on which the SKEW derivative contracts are based. At expiration, the backend systems 312 determine the appropriate settlement amounts and supply final settlement data to the Clearing Corporation. The Clearing Corporation acts as the exchange's bank and performs a final mark-to-market on Member Firm margin accounts based on the positions taken by the Member Firms' customers. The final mark-to-market reflects the final settlement amounts for the SKEW derivative contracts, and the Clearing Corporation debits/credits Member Firms' accounts accordingly. These data are also forwarded to the Member Firms' systems 316 so that they may update their customer accounts as well.

Figure 4:
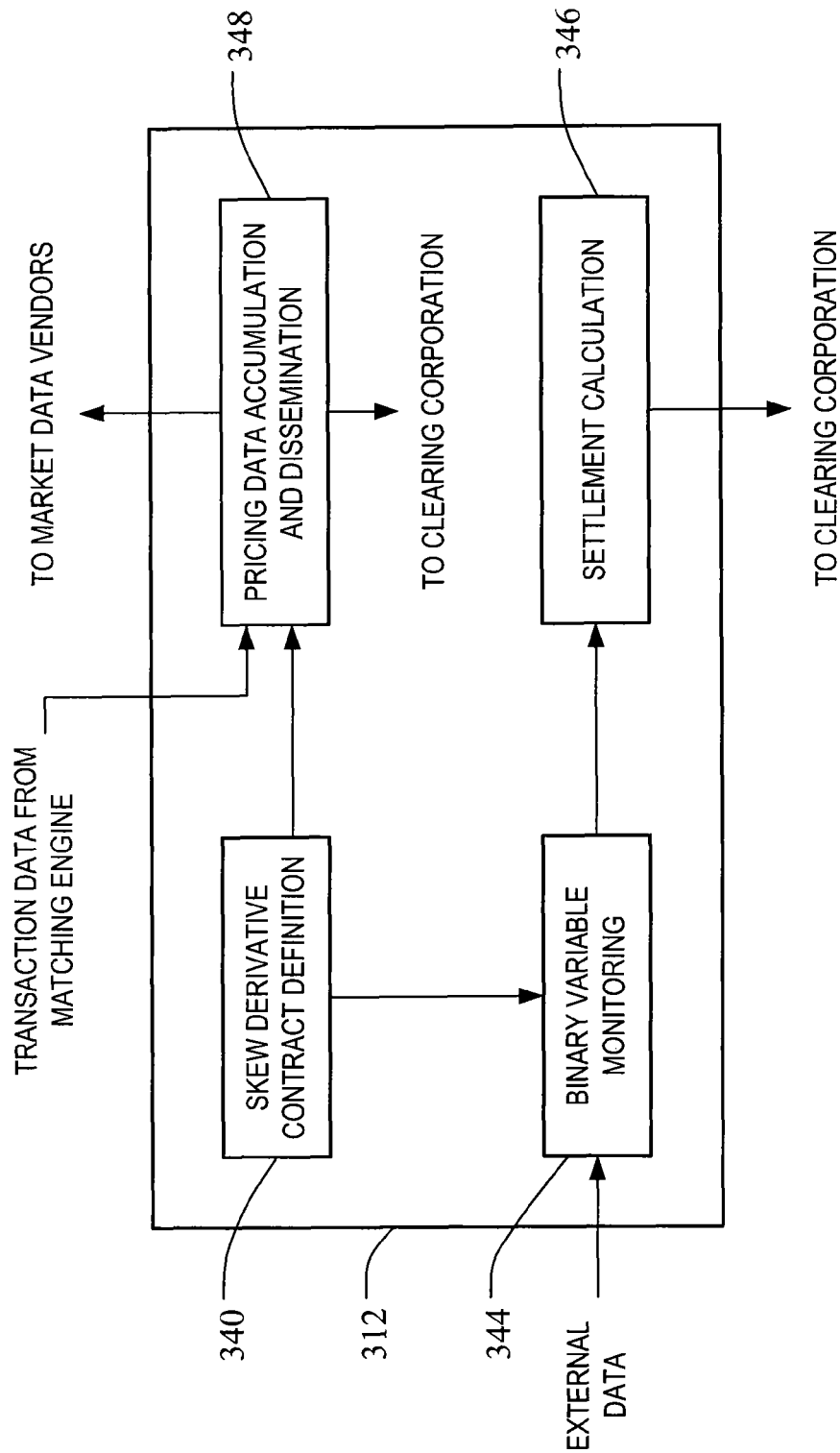
FIG. 4 is a block diagram of exchange backend systems for calculating and disseminating a SKEW index and trading SKEW derivatives based on the SKEW index.

FIG. 4 shows the exchange backend systems 312 used for creating and disseminating a SKEW index and/or creating, listing and trading SKEW derivative contracts that are based on a SKEW index in more detail. A SKEW derivative contract definition module 340 stores all relevant data concerning the SKEW derivative contract to be traded on the trading platform 320, including, for example, the contract symbol, a definition of the underlying asset or assets associated with the SKEW derivative, or a term of a calculation period associated with the SKEW derivative. A pricing data accumulation and dissemination module 348 receives contract information from the SKEW derivative contract definition module 340 and transaction data from the matching engine 310. The pricing data accumulation and dissemination module 348 provides the market data regarding open bids and offers and recent transactions to the market data vendors 318. The pricing data accumulation and dissemination module 348 also forwards transaction data to the Clearing Corporation so that the Clearing Corporation may mark-to-market the accounts of Member Firms at the close of each trading day, taking into account current market prices for the SKEW derivative contracts. Finally, a settlement calculation module 346 receives input from the SKEW derivative monitoring module 344. On the settlement date the settlement calculation module 346 calculates the settlement amount based on the SKEW value associated with the underlying asset or assets. The settlement calculation module 346 forwards the settlement amount to the Clearing Corporation, which performs a final mark-to-market on the Member Firms' accounts to settle the SKEW derivative contract.

Figure 5:
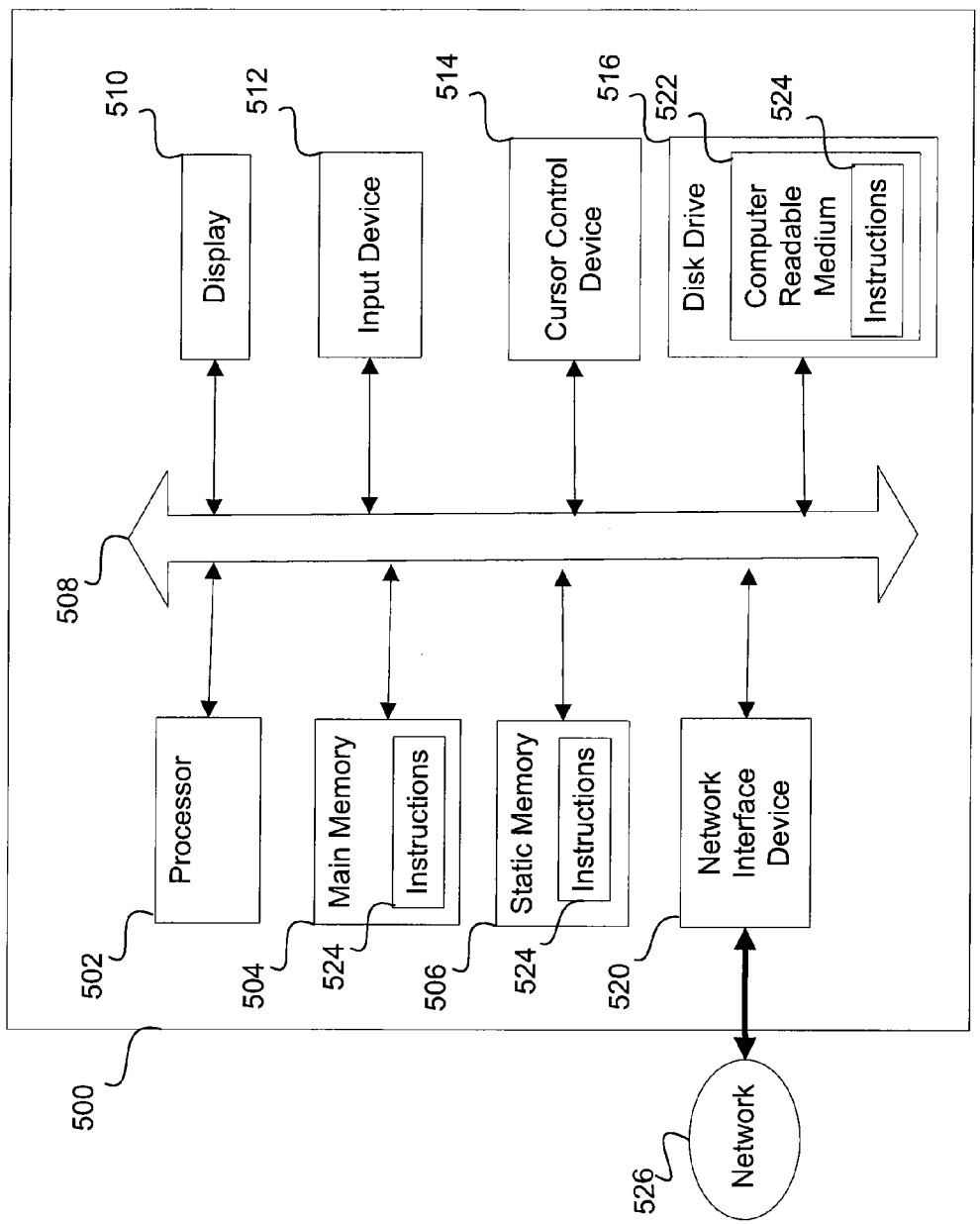
FIG. 5 an illustrative embodiment of a general computer system.

Referring to FIG. 5, an illustrative embodiment of a general computer system that may be used for one or more of the components shown in FIG. 4, or in any other trading system configured to carry out the methods discussed above, is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). Additionally, the computer system 500 may include an input device 512, such as a keyboard, and a cursor control device 514, such as a mouse. The computer system 500 can also include a disk drive unit 516 and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used by investment management companies, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Illustrative Example

In the following illustrative example, the underlying asset is the S&P 500®, the calculation period is 30 days, the SKEW index of the underlying asset is calculated from a portfolio of at-the-money and out-of-the-money S&P 500® options that mimics an exposure to a skewness payoff, and the SKEW index is calculated at 10:45 Central on Jul. 28, 2010.

As discussed above, the SKEW index may be calculated based on the equation:

$$S = \frac{E[R^3] - 3E[R]E[R^2] + 2E[R]^3}{(E[R^2] - E^2[R])^{\frac{3}{2}}} = \frac{P_3 - 3P_1P_2 + 2P_1^3}{(P_2 - P_1^2)^{\frac{3}{2}}}.$$

where $P_1$, $P_2$, and $P_3$ are calculated using the equations:

$$P_1 = \mu = E[R_T] = e^{rT}\left(-\sum_i \frac{1}{K_i^2} Q_{K_i}\Delta_{K_i}\right) + \varepsilon_1$$

$$P_2 = E[R_T^2] = e^{rT}\left(\sum_i \frac{2}{K_i^2}\left(1 - \ln\left(\frac{K_i}{F_0}\right)\right)Q_{K_i}\Delta_{K_i}\right) + \varepsilon_2$$

$$P_3 = E[R_T^3] = e^{RT}\left(\sum_i \frac{3}{K_i^2}\left\{2\ln\left(\frac{K_i}{F_0}\right) - \ln^2\left(\frac{K_i}{F_0}\right)\right\}Q_{K_i}\Delta_{K_i}\right) = \varepsilon_3$$

Further, as discussed above, epsilon 1, 2, and 3 ($\epsilon_1$, $\epsilon_2$, and $\epsilon_3$) are calculated using the equations:

$$\varepsilon_1 = -\left(1 + \ln\left(\frac{F_0}{K_0}\right) - \frac{F_0}{K_0}\right)$$

$$\varepsilon_2 = 2\ln\left(\frac{K_0}{F_0}\right)\left(\frac{F_0}{K_0} - 1\right) + \frac{1}{2}\ln^2\left(\frac{K_0}{F_0}\right)$$

$$\varepsilon_3 = \ln^2\left(\frac{K_0}{F_0}\right)\left(\frac{1}{3}\ln\left(\frac{K_0}{F_0}\right) - 1 + \left(\frac{K_0}{F_0}\right)\right)$$

$P_1$, $P_2$, and $P_3$ are built from strips of put and call options at different strike prices. While the strip should be centered around the S&P 500® forward price $F_0$ (a forward derivative level derived from derivative prices), there is often no listed strike price at $F_0$. Therefore, the strip is centered around a first listed strike price below $F_0$, known as $K_0$.

Table 1 below illustrates a set of sample components of a SKEW index. In Table 1, $K_0$ is set at the strike price 1105. At the center strike price, the calculation averages over a call and a put. For strikes smaller than $K_0$, puts are used to calculate terms for $P_1$, $P_2$, and $P_3$. For strikes larger than $K_0$, calls are used to calculate terms for $P_1$, $P_2$, and $P_3$.

that are used to calculate the SKEW index. The values for $P_1$, $P_2$, and $P_3$ are calculated based on a sum of the terms associated with each strike price shown in the sixth, seventh, and eighth columns of Table 1. The terms in the sixth column of Table 1 are calculated according to the equation:

$$\frac{1}{K_i^2} Q_{K_i} \Delta_{K_i};$$

the terms in the seventh column of Table 1 are calculated according to the equation:

$$\frac{2}{K_i^2}\left(1 - \ln\left(\frac{K_i}{F_0}\right)\right) Q_{K_i} \Delta_{K_i};$$

and the terms in the eighth column of Table 1 are calculated according to the equation:

TABLE 1

Sample of Calculated Values of Components of a SKEW Index

| Strike | Put Midquote | delta k | Call Midquote | midcall − midput | for P1 | for P2 | for P3 | Exposure to −10 * skewness portfolio |
|---|---|---|---|---|---|---|---|---|
| 690 | 0 | | 416.45 | | | | | |
| 695 | 0 | | 412.05 | | | | | |
| 700 | 0.075 | 5 | 407.8 | 407.725 | 7.6531E−07 | 2.23E−06 | −2.59E−06 | 0.009930169 |
| 705 | 0.075 | 5 | 403.65 | 403.575 | 7.5449E−07 | 2.19E−06 | −2.5E−06 | 0.009681804 |
| 710 | 0.075 | 5 | 398.3 | 398.225 | 7.4390E−07 | 2.15E−06 | −2.42E−06 | 0.009438799 |
| 715 | 0.075 | 5 | 391.65 | 391.575 | 7.3353E−07 | 2.11E−06 | −2.34E−06 | 0.00920102 |
| 720 | 0.075 | 5 | 387.8 | 387.725 | 7.2338E−07 | 2.07E−06 | −2.27E−06 | 0.008968339 |
| ... | ... | ... | ... | ... | | | | |
| 1095 | 17.95 | 5 | 30.05 | 12.1 | 7.4852E−05 | 0.000151 | −4.86E−06 | 0.000103684 |
| 1100 | 19.75 | 5 | 26.65 | 6.9 | 8.1612E−05 | 0.000164 | −3.05E−06 | 5.1038E−05 |
| 1105 | 21.85 | 5 | 23.7 | 1.85 | 9.3262E−05 | 0.000187 | −9.37E−07 | −6.63095E−07 |
| 1110 | 24.25 | 5 | 21.35 | −2.9 | 8.6641E−05 | 0.000173 | 1.48E−06 | −5.14376E−05 |
| 1115 | 26.55 | 5 | 19.65 | −6.9 | 7.9028E−05 | 0.000157 | 3.47E−06 | −0.000101303 |
| 1120 | 29.2 | 5 | 16.05 | −13.15 | 6.3975E−05 | 0.000126 | 4.51E−06 | −0.000150277 |
| 1125 | 31.9 | 5 | 14.3 | −17.6 | 5.6494E−05 | 0.000111 | 5.47E−06 | −0.000198376 |
| 1130 | 35.05 | 5 | 11.95 | −23.1 | 4.6793E−05 | 9.16E−05 | 5.75E−06 | −0.000245616 |
| 1135 | 37.7 | 5 | 9.95 | −27.75 | 3.8619E−05 | 7.53E−05 | 5.75E−06 | −0.000292014 |
| ... | ... | ... | ... | ... | | | | |
| 1205 | 98.6 | 5 | 0.475 | −98.125 | 1.6356E−06 | 2.99E−06 | 7.98E−07 | −0.000861405 |
| 1210 | 102.15 | 5 | 0 | −102.15 | 0.0000E+00 | 0 | 0 | 0 |
| 1215 | 108.5 | 5 | 0.525 | −107.98 | 1.7782E−06 | 3.22E−06 | 9.48E−07 | −0.000931744 |
| 1220 | 113.5 | 5 | 0 | −113.5 | 0.0000E+00 | 0 | 0 | 0 |
| 1225 | 118.4 | 5 | 0.2 | −118.2 | 6.6639E−07 | 1.2E−06 | 3.85E−07 | −0.000999623 |
| 1230 | 123.55 | 5 | 0.175 | −123.38 | 5.7836E−07 | 1.03E−06 | 3.47E−07 | −0.001032668 |
| 1235 | 127.3 | 5 | 0.15 | −127.15 | 4.9173E−07 | 8.76E−07 | 3.06E−07 | −0.001065131 |
| 1240 | 132.7 | 5 | 0.375 | −132.33 | 1.2194E−06 | 2.16E−06 | 7.84E−07 | −0.001097021 |
| 1245 | 138.7 | 5 | 0.125 | −138.58 | 4.0322E−07 | 7.12E−07 | 2.68E−07 | −0.001128349 |
| 1250 | 142.7 | 5 | 0.075 | −142.63 | 2.4000E−07 | 4.22E−07 | 1.64E−07 | −0.001159126 |
| 1255 | 148.35 | 5 | 0.175 | −148.18 | 5.5555E−07 | 9.72E−07 | 3.92E−07 | −0.00118936 |
| 1260 | 153.35 | 5 | 0 | | | | | |
| 1265 | 158.35 | 5 | 0 | | | | | |

In Table 1, column one includes the strike price of the option ($K_i$), the midquote of the option ($Q_{Ki}$) is located in the second column for strike prices below strike price 1105 (the center strike price); the midquote of the option ($Q_{Ki}$) is located in the fourth column for strike prices above strike price 1105; and the third column of the table includes delta $K_i$, the strike interval associated with strike $K_i$.

Table 1, additionally illustrates the terms of $P_1$, $P_2$, and $P_3$ at a given option expiration date for different puts and calls $$\frac{3}{K_i^2}\left\{2\ln\left(\frac{K_i}{F_0}\right) - \ln^2\left(\frac{K_i}{F_0}\right)\right\} Q_{K_i} \Delta_{K_i}.$$

After the terms for $P_1$, $P_2$, and $P_3$ are calculated for each strike price, the terms are summed; the epsilons ($\epsilon_1$, $\epsilon_2$, and $\epsilon_3$) are calculated; and the SKEW index can be calculated. Table 2 below illustrates values from August 2010 and September 2010 S&P 500® options for use in the example.

TABLE 2

Values from Aug. and Sept. S&P 500 ® options

| Trade Date | Jul. 28, 2010 | P1 = E[R] | −0.00173 | Trade Date | Jul. 28, 2010 | P1 = E[R] | −0.0041 |
|---|---|---|---|---|---|---|---|
| Expiration Date | Aug. 20, 2010 | P2 = E[R^2] | 0.003606 | Expiration Date | Sep. 17, 2010 | P2 = E[R^2] | 0.00864 |
| Time to Expiration = tau | 0.065 | P3 = E[R^3] | −0.00049 | Time to Expiration | 0.142 | P3 = E[R^3] | −0.001 |
| Treasury Bill Rate | 0.00155 | Std. Dev. [R] | 0.060021 | Treasury Bill Rate | 0.00155 | Std. Dev. [R] | 9.29% |
| Forward Price | 1106.85 | Skewness | −2.19656 | Forward Price | 1106.45 | Skewness | −1.68 |
| Center Strike | 1105 | SKEW @ 23 days | 121.9656 | Center Strike | 1105 | SKEW @ 51 day | 116.75 |
| Epsilon 1 | 1.40E−06 | VIX @ 23 days | 22.98 | Epsilon 1 | 8.61E−07 | VIX @ 51 days | 24.01 |
| Epsilon 2 | −4.2E−06 | Delta Hedge Position | −0.41 | Epsilon 2 | −2.58E−06 | Delta Hedge Position | −0.62984 |
| Epsilon 3 | 1.176E−11 | TBill Position | 100.00 | Epsilon 3 | 4.442E−12 | TBill Position | 100.00 |

In the illustrative example, because a portfolio of options used to determine a SKEW index of the S&P 500® is not available with the same expiration date as the SKEW derivative associated with the S&P 500® (30 days from Jul. 28, 2010), S is derived using the equation below based on two portfolio of options with adjacent expirations, $S_{near}$ and $S_{next}$:

$$S = w S_{near} + (1-w) S_{next},$$

where $w = (T_{next} - T_N)/(T_{next} - T_{near})$; $T_{near}$ and $T_{next}$ are times to expiration of the near and next term derivatives expressed in minutes; and $T_N$ is the number of minutes during the 30 day calculation period. Accordingly, using the values in Table 2 for options set to expire on Aug. 20, 2010 and options set to expire on Sep. 17, 2010, S is calculated using the equation:

$$S = 0.730208333*(-2.19656) + 0.269791667*(-1.68) = -2.056$$

In implementations where the SKEW index is defined to be:

$$\text{SKEW index} = 100 - 10*S,$$

SKEW index is calculated to be:

$$\text{SKEW index} = 100 - 10*(-2.056) = 120.56$$

Further details regarding this illustrative example can be found on pages 13-19 of U.S. Provisional Pat. App. No. 61/446,695, filed Feb. 25, 2011

It is intended that the foregoing detailed description be regarded as illustrative rather than limiting, and that it be understood that it is the following claims, including all equivalents, that are intended to define the spirit and scope of this invention.

The invention claimed is:

1. A computer-implemented method of calculating a SKEW index associated with an underlying asset, the method comprising:
    with a processor in a trading platform:
        calculating a SKEW index associated with an underlying asset;
        creating a skew derivative associated with the underlying asset based on the SKEW index associated with the underlying asset; and
        displaying the SKEW index associated with the underlying asset and the SKEW derivative associated with the underlying asset on a trading platform display device coupled with the trading platform;
    wherein the SKEW index is calculated based on the equation:

$$S = E\frac{R}{\phantom{x}} \div^3,$$

where S represents a market price of a skewness payoff determined by an asymmetry of the plurality of returns associated with the underlying asset; R is a log return of the underlying asset at an end of a calculation period, μ is a mean of the log return of the underlying asset at the end of the calculation period, and σ is a standard deviation of the log return of the underlying asset at the end of the calculation period;

$$x = \frac{R}{\phantom{x}} \div^3$$

represents the skewness payoff; and S=E[x] is a market price representing a risk adjusted expectation of the skewness payoff (x).

2. The computer-implemented method of claim 1, wherein the underlying asset is the S&P 500® and the calculation period is 30 days.

3. The computer-implemented method of claim 1, wherein the underlying asset is selected from the group consisting of: commodity or structured products traded on a trading platform or over-the-counter market; equity indexes or securities; fixed income indexes or securities; foreign currency exchange rates; interest rates; and commodity indexes.

4. The computer-implemented method of claim 1, wherein the SKEW index is calculated based on the equation:

$$\text{SKEW index} = 100 - 10*S.$$

5. The computer-implemented method of claim 1, wherein S is derived based on the equation:

$$S = wS_{near} + (1-w)S_{next},$$

where $S_{near}$ and $S_{next}$ are prices of skewness at derivatives with adjacent expirations; $w = (T_{next} - T_N)/(T_{next} - T_{near})$; $T_{near}$ and $T_{next}$ are times to expiration of the near and next term derivatives expressed in minutes; and $T_N$ is the number of minutes during the calculation period.

6. The computer-implemented method of claim 1, further comprising:
    transmitting the SKEW index associated with the underlying asset over a least one electronic dissemination network.

7. The computer-implemented method of claim 1, wherein the trading platform is an exchange.

8. A trading system comprising:
    a display device;
    a memory storing a set of instructions for calculating a SKEW index associated with an underlying asset and creating a SKEW derivative associated with the underlying asset based on the SKEW index; and
    a processor in communication with the display device and the memory, the processor configured to execute the set of instructions stored in the memory and to:
        calculate a SKEW index associated with an underlying asset;

create a SKEW derivative associated with the underlying asset based on the SKEW index; and
display the SKEW index associated with the underlying asset and the SKEW derivative associated with the underlying asset on the display device;
wherein the SKEW index is calculated based on the equation:

$$S = E\left[\left(\frac{R-\mu}{\sigma}\right)^3\right],$$

where S represents a market price of a skewness payoff determined by an asymmetry of the plurality of returns associated with the underlying asset; R is a log return of the underlying asset at an end of a calculation period, µ is a mean of the log return of the underlying asset at the end of the calculation period, and σ is a standard deviation of the log return of the underlying asset at the end of the calculation period;

$$x = \left(\frac{R-\mu}{\sigma}\right)^3$$

represents the skewness payoff; and S=E[x] is a market price representing a risk adjusted expectation of the skewness payoff (x).

9. The trading system of claim 8, wherein the SKEW index is calculated based on the equation:

SKEW index=100−10*S.

10. A computer-implemented method of creating a SKEW derivative, the method comprising:
accessing a SKEW index associated with an underlying asset;
creating, with a processor, a SKEW derivative based on the SKEW index; and
transmitting, with the processor, information associated with the SKEW derivative for display;
wherein the SKEW index is calculated based on the equation:

$$S = E\frac{R}{\quad} \div^3,$$

where S represents a market price of a skewness payoff determined by an asymmetry of the plurality of returns associated with the underlying asset; R is a loci return of the underlying asset at an end of a calculation period, µ is a mean of the loci return of the underlying asset at the end of the calculation period, and σ is a standard deviation of the loci return of the underlying asset at the end of the calculation period;

$$x = \frac{R}{\quad} \div^3$$

represents the skewness payoff; and S=E[x] is a market price representing a risk adjusted expectation of the skewness payoff (x).

11. The computer-implemented method of claim 10, wherein the SKEW index is calculated based on the equation:

SKEW index=100−10*S.

12. The computer-implemented method of claim 10, wherein S is derived based on the equation:

$$S = wS_{near} + (1-w)S_{next};$$

where $S_{near}$ and $S_{next}$; are prices of skewness at derivatives with adjacent expirations; $w = (T_{next} - T_N) - (T_{next} - T_{near})$; $T_{near}$ and $T_{next}$, are times to expiration of the near and next term derivatives expressed in minutes; and $T_N$ is the number of minutes during the calculation period.

13. The computer-implemented method of claim 10, wherein the SKEW derivative is a SKEW option contract.

14. The computer-implemented method of claim 13, wherein the underlying asset is the S&P 500®.

15. The computer-implemented method of claim 10, wherein the SKEW derivative is a SKEW futures contract.

16. The computer-implemented method of claim 10, wherein the underlying asset is selected from the group consisting of: commodity or structured products traded on a trading platform or over-the-counter market; equity indexes or securities; fixed income indexes or securities; foreign currency exchange rates; interest rates; and commodity indexes.

17. The computer-implemented method of claim 10, further comprising:
executing trades at a trading platform for the SKEW derivative by matching bids and offers to buy and sell positions in the SKEW derivative.

18. The computer-implemented method of claim 17, wherein the trading platform is an open outcry platform.

19. The computer-implemented method of claim 17, wherein the trading platform is an electronic platform.

20. The computer-implemented method of claim 17, wherein the trading platform is a hybrid of an open outcry platform and an electronic platform.

21. The computer-implemented method of claim 10, further comprising:
transmitting a SKEW derivative quote from a trading platform over a least one electronic dissemination network.

22. The computer-implemented method of claim 21, wherein the trading platform is an exchange.

23. The computer-implemented method of claim 10, wherein the information associated with the SKEW derivative that is transmitted for display comprises a settlement price of the SKEW derivative.

24. The computer-implemented method of claim 10, wherein the information associated with the SKEW derivative that is transmitted for display comprises a bid associated the SKEW derivative.

25. The computer-implemented method of claim 10, wherein the information associated with the SKEW derivative that is transmitted for display comprises an offer associated the SKEW derivative.

26. A system comprising:
a memory storing a set of instructions for creating a SKEW derivative; and
a processor in communication with the memory, the processor configured to execute the set of instructions stored in the memory and to:
access a SKEW index associated with an underlying asset;
create the SKEW derivative based on the SKEW index; and
transmit information associated with the SKEW derivative for display;

wherein the SKEW index is calculated based on the equation:

$$S = E\frac{R}{} \div 3,$$

where S represents a market price of a skewness payoff determined by an asymmetry of the plurality of returns associated with the underlying asset; R is a log return of the underlying asset at an end of a calculation period, µ is a mean of the loci return of the underlying asset at the end of the calculation period, and σ is a standard deviation of the loci return of the underlying asset at the end of the calculation period;

$$x = \frac{R}{} \div 3$$

represents the skewness payoff; and S=E[x] is a market price representing a risk adjusted expectation of the skewness payoff (x).

27. The system of claim 26, wherein the SKEW index is calculated based on the equation:

SKEW index=100−10*S.

28. The system of claim 26, wherein the underlying asset is the S&P 500®.

29. The system of claim 26, wherein the information associated with the SKEW derivative that is transmitted for display comprises a settlement price of the SKEW derivative.

30. The system of claim 26, wherein the information associated with the SKEW derivative that is transmitted for display comprises a bid associated the SKEW derivative.

31. The system of claim 26, wherein the information associated with the SKEW derivative that is transmitted for display comprises an offer associated the SKEW derivative.

* * * * *